(12) United States Patent
Bose et al.

(10) Patent No.: US 11,062,179 B2
(45) Date of Patent: Jul. 13, 2021

(54) METHOD AND DEVICE FOR GENERATIVE ADVERSARIAL NETWORK TRAINING

(71) Applicant: ROYAL BANK OF CANADA, Montreal (CA)

(72) Inventors: Avishek Bose, Toronto (CA); Yanshuai Cao, Toronto (CA)

(73) Assignee: ROYAL BANK OF CANADA, Montreal (CA)

(*) Notice: Subject to any disclaimer, the term of this patent is extended or adjusted under 35 U.S.C. 154(b) by 51 days.

(21) Appl. No.: 16/179,469

(22) Filed: Nov. 2, 2018

(65) Prior Publication Data

US 2019/0130221 A1  May 2, 2019

Related U.S. Application Data

(60) Provisional application No. 62/580,821, filed on Nov. 2, 2017.

(51) Int. Cl.
*G06K 9/62* (2006.01)
*G06N 3/08* (2006.01)
*G06K 9/72* (2006.01)
*G06N 3/04* (2006.01)
*G06F 16/532* (2019.01)

(52) U.S. Cl.
CPC ......... *G06K 9/6257* (2013.01); *G06F 16/532* (2019.01); *G06K 9/6262* (2013.01); *G06K 9/6267* (2013.01); *G06K 9/726* (2013.01); *G06N 3/0472* (2013.01); *G06N 3/088* (2013.01)

(58) Field of Classification Search
CPC ........ G06N 3/08; G06N 3/0472; G06N 7/005; G06N 3/0481; G06N 3/0454; G06K 9/6271; G06K 9/6262; G06K 9/6257
See application file for complete search history.

(56) References Cited

U.S. PATENT DOCUMENTS

| | | | |
|---|---|---|---|
| 2015/0095017 A1* | 4/2015 | Mnih | G06N 3/0472 704/9 |
| 2018/0336439 A1* | 11/2018 | Kliger | G06N 3/0454 |
| 2018/0336471 A1* | 11/2018 | Rezagholizadeh | G06N 3/088 |
| 2018/0365674 A1* | 12/2018 | Han | G06F 30/20 |
| 2019/0122120 A1* | 4/2019 | Wu | G06N 3/0472 |

OTHER PUBLICATIONS

Generative Adversarial Net—Jun. 2014 (Year: 2014).*
Improved Techniques for Training GAN—Jun. 2016 (Year: 2016).*
DeepCancer: Detecting Cancer via Deep Generative Learning through Gene Expressions (Year: 2017).*

* cited by examiner

*Primary Examiner* — Nizar N Sivji
(74) *Attorney, Agent, or Firm* — Norton Rose Fulbright Canada LLP

(57) ABSTRACT

An electronic device for neural network training includes at least one processor and one or more memories configured to provide or train: a generative adversarial network (GAN) using a generator and a discriminator for: receiving a plurality of training cases; and training the generative adversarial network, based on the plurality of training cases, to classify the training cases; wherein the generator generates hard negative examples for the discriminator.

20 Claims, 7 Drawing Sheets

Training Plots for Skip-Gram Model Trained from Scratch
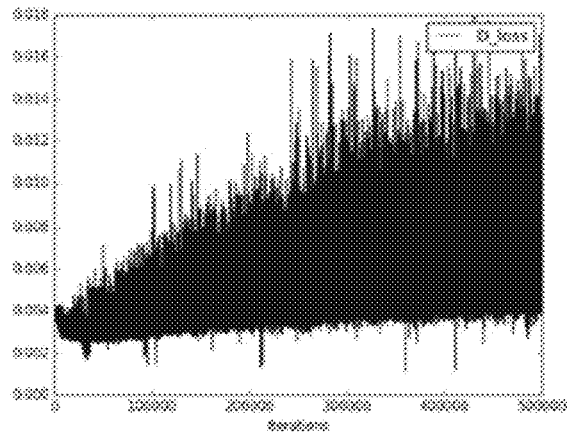
Figure 1: Discriminator Loss (NCE+ACE sampling)
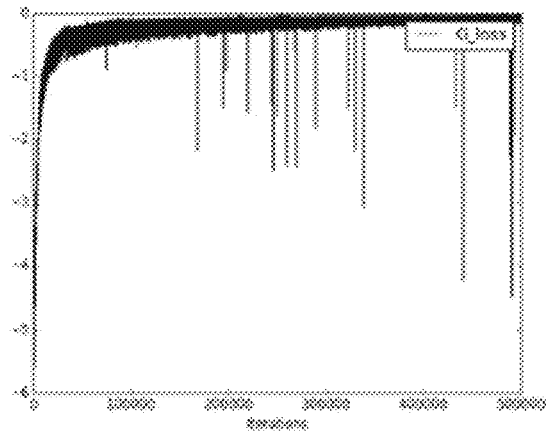
Figure 2: Generator Loss
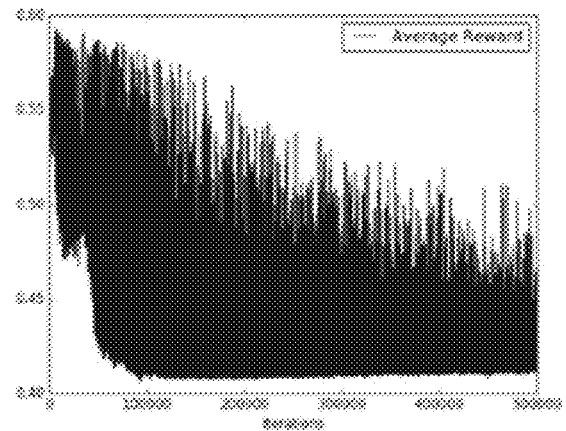
Figure 3: Average Normalized Reward for Generator per iteration

Training Plots for Finetuned Models
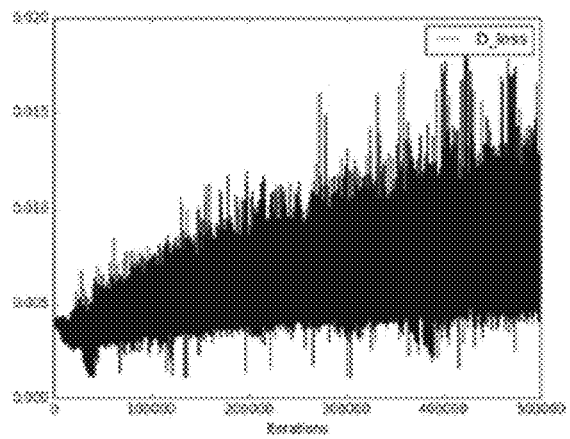
Figure 4: C&W Discriminator Loss (NCE+ACE sampling)
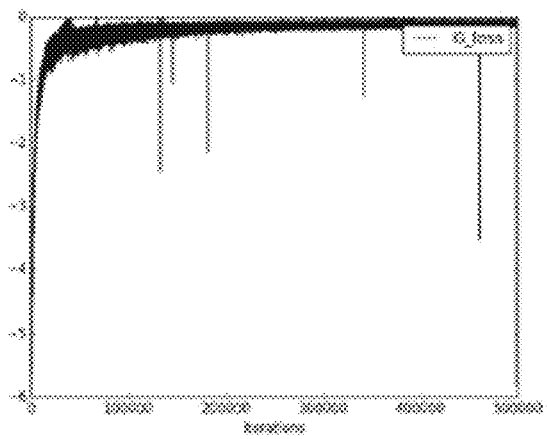
Figure 5: C&W Generator Loss
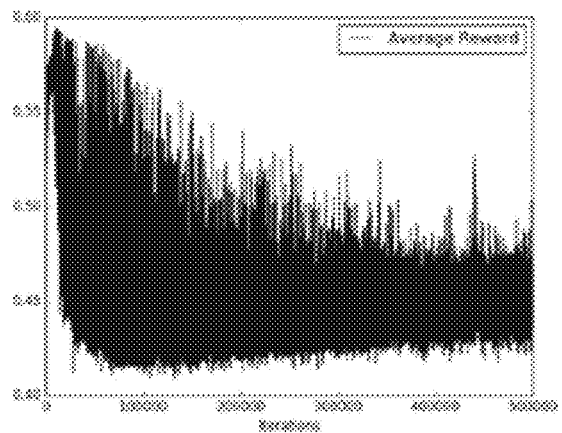
Figure 6: C&W Average Normalized Reward for Generator per iteration

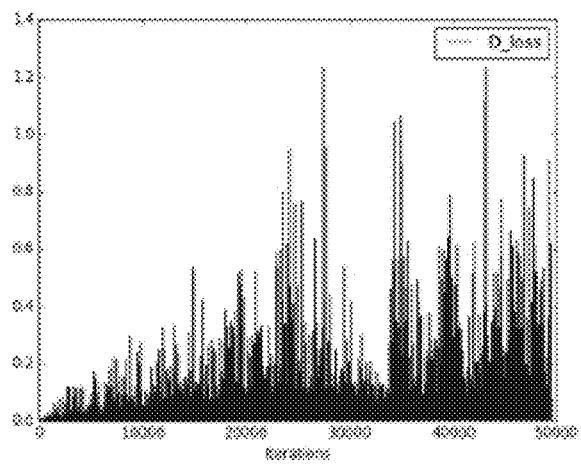
Figure 7: 50-d Glove Discriminator Loss (NCE+ACE sampling)
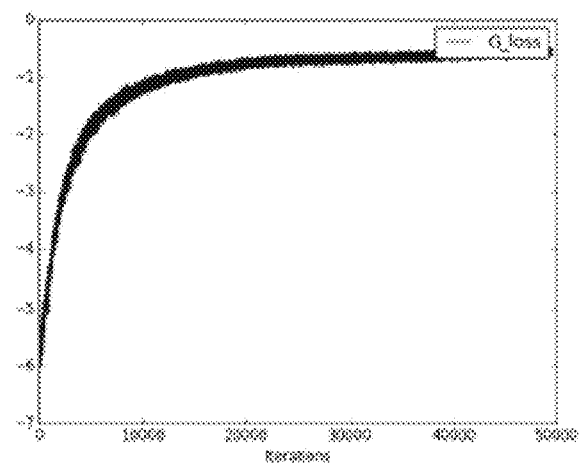
Figure 8: 50-d Glove Generator Loss
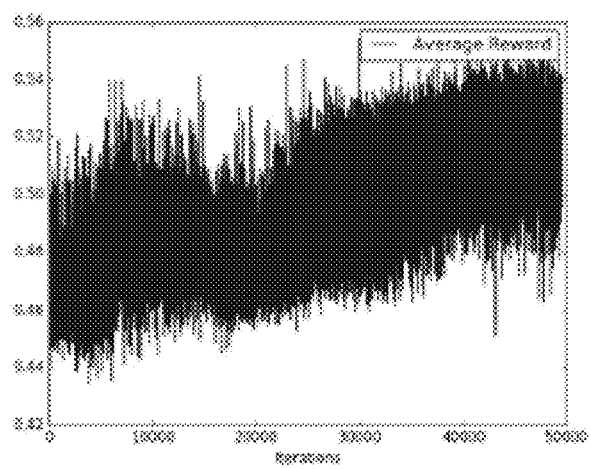
Figure 9: 50-d Glove Average Normalized Reward for Generator per iteration

METHOD AND DEVICE FOR GENERATIVE ADVERSARIAL NETWORK TRAINING

CROSS-REFERENCE

This application claims the benefit of and priority to U.S. provisional patent application No. 62/580,821 filed on Nov. 2, 2017, the entire content of which is herein incorporated by reference.

FIELD

Aspects of the example embodiments described herein generally relate to the field of neural networks. Particularly, some embodiments relate to the field of neural network training for Generative Adversarial Networks (GANs).

INTRODUCTION

Many models learn by comparing losses on positive examples with those on negative examples. In unsupervised learning, positive examples are observed data and negative examples could be from anywhere else. In supervised learning, positive examples consist of observed input-output pairs, while negative examples could be any paired configurations that are not observed in real data. With only easy negative examples, learning does not force the model to find critical characteristics of "good configurations", leading to lack of discriminativeness in supervised setting and lack of sharpness in unsupervised learning.

SUMMARY

In accordance with one aspect, there is provided an electronic device for neural network training comprising at least one processor and one or more memories configured to provide and/or train: a generative adversarial network (GAN) using a conditional generator network configured to draw samples of context words given inputs words from a distribution that is adapted through the course of training an electronic device for improved neural network training.

In various further aspects, the disclosure provides corresponding systems and devices, and logic structures such as machine-executable coded instruction sets for implementing such systems, devices, and methods.

In accordance with one aspect, an electronic device for improved neural network training is provided. The device may include: one or more processors; a non-transitory computer-readable medium storing one or more programs and data representative of a generative adversarial network (GAN) having a plurality of nodes and weights, the GAN including a generator and a discriminator, wherein the one or more programs are configured to be executed by the one or more processors, the one or more programs including instructions for: receiving data representative of a plurality of training samples; generating, by the generator, a plurality of hard negative samples based on the plurality of training samples; and generating an output, by the discriminator, based on the plurality of hard negative samples from the generator.

In some embodiments, at least one of the generator and the discriminator is a neutral network.

In some embodiments the generator is defined for an image or caption retrieval.

In some embodiments the generator for the image retrieval is based on: $\lambda p_{noise}(i)+(1-\lambda)g_\theta(i|c)$, wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images in the plurality of training cases.

In some embodiments the generator for the caption retrieval is based on: $\lambda p_{noise}(c)+(1-\lambda)g_\theta(i|c)$, wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images including correctly labelled images.

In some embodiments, an output of the discriminator is used as a feedback to the generator.

In some embodiments, the a score for an image-caption pair is used as a reward for the generator.

In some embodiments, the GAN is configured to: receive data representative of an image, and generate an output to identify, from a plurality of text strings, a corresponding text string based on the data representative of the image.

In some embodiments, the GAN is configured to: receive data representative of a text string, and generate an output to identify, from a plurality of images, a corresponding image based on the data representative of the text string.

In accordance with another aspect, a computer-implemented method is provided. The method may include: receiving, by a generative adversarial network (GAN) having a plurality of nodes and weights, the GAN including a generator and a discriminator, data representative of a plurality of training samples; generating, by the generator, a plurality of hard negative samples based on the plurality of training samples; and generating an output, by the discriminator, based on the plurality of hard negative samples from the generator.

In some embodiments, at least one of the generator and the discriminator is a neutral network.

In some embodiments, the generator for the image retrieval is based on: $\lambda p_{noise}(i)+(1-\lambda)g_\theta(i|c)$, wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images in the plurality of training cases.

In some embodiments, the generator for the caption retrieval is based on: $\lambda p_{noise}(c)+(1-\lambda)g_\theta(i|c)$, wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images including correctly labelled images.

In some embodiments, an output of the discriminator is used as a feedback to the generator.

In some embodiments, the a score for an image-caption pair is used as a reward for the generator.

In some embodiments, the GAN is configured to: receive data representative of an image, and generate an output to identify, from a plurality of text strings, a corresponding text string based on the data representative of the image.

In some embodiments, the GAN is configured to: receive data representative of a text string, and generate an output to identify, from a plurality of images, a corresponding image based on the data representative of the text string.

In accordance with yet another aspect, an electronic device is provided. The device may include: one or more processors; a memory storing one or more program configured to be executed by the one or more processors, the one or more programs including instructions for: receiving a text string or an image; processing the text string or the image using a generative adversarial network including a generator and a discriminator; and choosing an matched image based on the processed text string from a plurality of images, or choosing a matched text string based on the processed image from a plurality of text strings; wherein during a training phase, the generator is configured to generate a plurality of hard negatives samples for the discriminator.

In some embodiments, the generator is based on: $\lambda p_{noise}(i)+(1-\lambda)g_\theta(i|c)$, wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images in a plurality of training cases.

In some embodiments, the generator for is based on: $\lambda p_{noise}(c)+(1-\lambda)g_\theta(i|c)$, wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images including correctly labelled images.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 1-3 show example training curves for 300-dimensional word embeddings;

FIGS. 4-9 show training curves and examples of pretraining 50-dimensional Glove word embeddings and word embeddings take from Colbert & Weston work.

DETAILED DESCRIPTION

Figure 10:
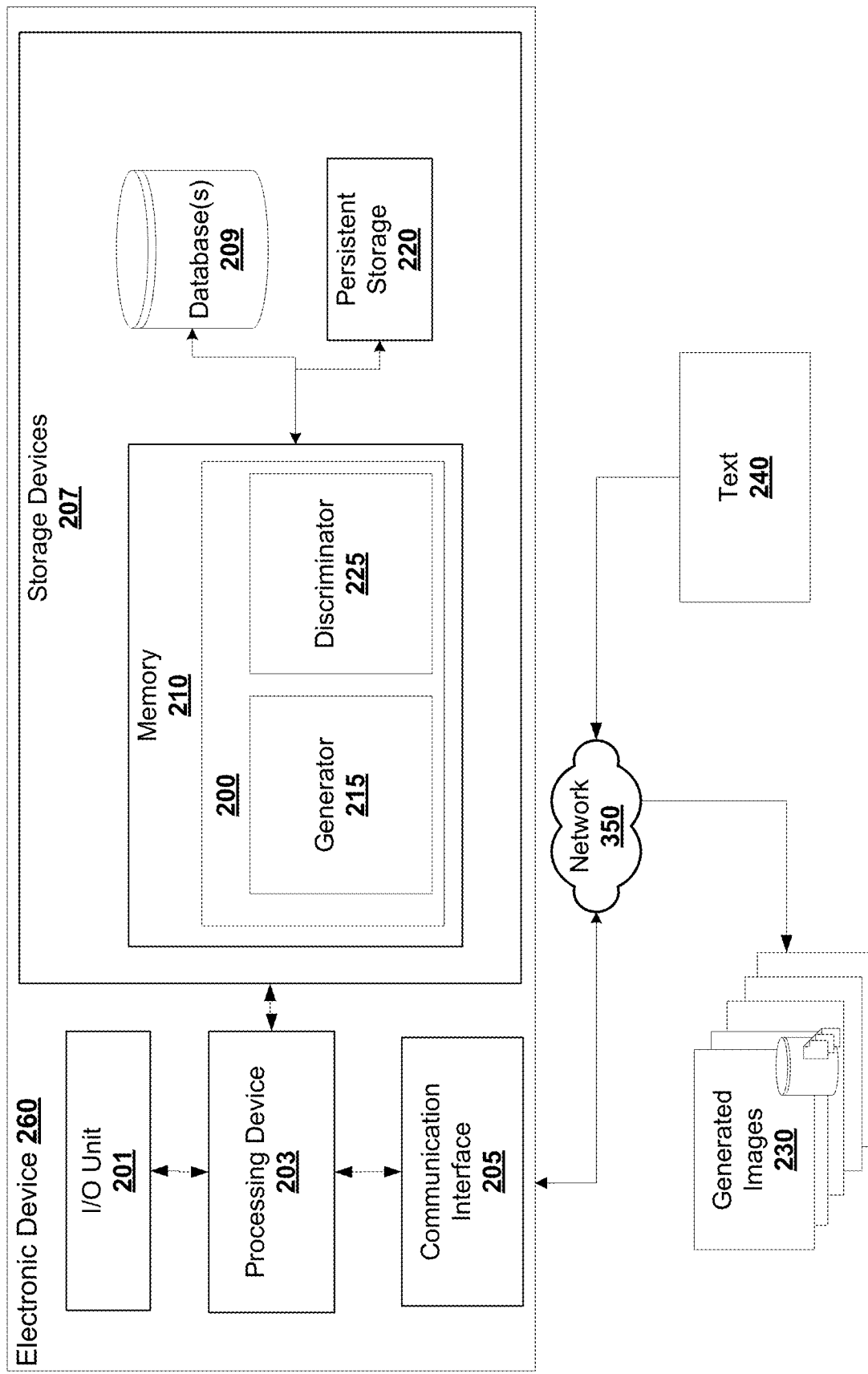
FIG. 10 shows an example electronic device for generative adversarial network training.

Generative adversarial networks (GANs) are a class of neural networks used in unsupervised machine learning. GANs can be implemented by a system of two neural networks contesting with each other in a zero-sum game framework, for example. One network generates candidates (generator) and one network evaluates them (discriminator).

Generative adversarial networks (GANs) learn by having two neural networks playing a minimax game where a discriminator, D, tries to tell apart samples generated by a generator, G, from real data. In some embodiments, example architectures described herein may apply the adversarial principle to supervised contrastive learning scenarios. Instead of generating negative examples from noise, example architectures may adversarially learn a conditional sampling distribution over observed output data to form negative (unobserved) input-output pairs.

Contrastive learning approaches include maximum margin estimation used for SVM (support vector machines), structural and latent structural SVM, as well as triplet loss based supervised metric learning; contrastive divergence used for learning underdirected graphical models such as RBM (restricted Boltzmann machine); Noise Contrastive Estimation (NCE) and Negative Sampling used as computationally efficient replacements for full softmax. From the perspective of energy based models, learning needs to push energy down on positive samples, while pushing up at any other points in space. In all of these cases, positive examples are observed and hence losses and gradient of losses can be evaluated easily on them, but negative examples are not. Different estimation methods make different choices about where to evaluate negative example losses.

In some embodiments, methods and architectures described herein can adversarially learn an adaptive negative sampling distribution, to be used inside a contrastive learning framework. In the max margin estimation framework, the method can be viewed as an alternative to the typical loss augmented MAP inference, especially applicable in nonconvex settings when deep neural networks are used as scoring functions. In Noise Contrastive Estimation and Negative Sampling, experiments on an example architecture/method show that augmenting the original fixed sampling noise to a mixture distribution with the additional component being adversarially learned may improve word embedding models. Learning by Contrasting Positive and Negative Examples In some embodiments, adversarially learned adaptive negative sampling can be incorporated in various contrastive learning architectures/schemes.

The quality of Word Embeddings can be dependent on the size on the dataset they are trained on. As a result, it is often common to have vocabulary sizes of hundreds of thousands if not millions of words, which makes the computation of the softmax an expensive operation. In some embodiments, architectures using Noise Contrastive Estimation (NCE) can provide a computationally efficient alternative to the full softmax, where the problem is reduced to a binary classification task. Thus in NCE instead of prediction predicting the correct context word the model tries to distinguish positive word and context pairs, genuine data, from negative noise samples composed of word and false context pairs. The NCE objective is then defined as follows:

$$L = -\sum_{w_t \in V} \left[ \log p(y=1 | w_t, w_c) + \sum_{c=1}^{K} \log p(y=0 | w_t, \tilde{w}_c) \right], \quad (1)$$

Here, $w_c$ is sampled from the true set of contexts and $\tilde{w}_c \sim Q$ is sampled k times from a fixed noise distribution. The choice of noise distribution is a free parameter. In some embodiments, it is chosen as a variation of the uniform distribution when learning word embeddings.

Adversarial Contrastive Estimation for Word Embeddings

There are different approaches for selecting both the positive and negative examples used to learn f. In one approach is uniform sampling as commonly done in NCE. Concretely, in the case of learning Word Embeddings in Skip-Gram, this sampling scheme favors word context pairs that are frequent in the dataset and as a result word embeddings for rarer words are worse. In some scenarios, one of drawbacks of uniform sampling is that there is no principled way to determine whether the negative samples picked are hard examples which are crucial to learning progress.

In some embodiments, an architecture/method for generating hard negative examples (or hard negative samples) can be achieved in the GAN framework, where a conditional generator network can be used to draw samples of context words given input words from a distribution that is adapted through the course of training.

In some embodiments, use of hard negative samples may include using false positives or hard samples (e.g. samples that are statistically similar but have different classes) as negative samples during a training phase of the GAN.

In some embodiments, training data may include hard negative samples. Hard negative samples may be negative samples which are initially misclassified by the GAN. This process may be repeated a few times if needed.

Specifically, in some embodiments, using a conditional discriminator NCE loss may be augmented such that the fake examples are drawn from both a uniform distribution but also an adversarial one as modeled by the conditional generator. Let $(w_t, w_c)$ denote a positive example where both input and context words are drawn from the real data distribution and $(w_t, \tilde{w}_c)$ denote a negative example where the context word is sampled from either an adversarial or an NCE based uniform distribution. The GAN Value function is then defined as:

$$V(D, G) = \mathbb{E}_{w_c \sim \mathbb{P}_r} [\log D(w_c | w_t)] + \qquad (2)$$
$$\mathbb{E}_{\tilde{w}_c \sim \mathbb{P}_z}[1 - \log D(w_c | w_i)] + \mathbb{E}_{\tilde{w}_c \sim \mathbb{P}_{nce}} [1 - \log D(\tilde{w}_c | w_t)],$$

Where for the second term on the right $\tilde{w}_c = G(z|w_t)$ and $z \sim \mathbb{P}_z$. The conditional generator network may require special treatment in the case of discrete data as one cannot backpropagate through the sampling process. In the case of word embeddings, in some embodiments, categorical sampling uses the generator log probabilities in the final layer during the forward pass. The architecture can then, in some instances, update the conditional generator network using REINFORCE where the reward is taken to be the output of the discriminator. Intuitively, this means that whenever the generator samples a hard negative context word, the architecture provides extra incentive to adapt its negative distribution to produce more such examples. Thus the gradient update for the conditional generator, parametrized by θ, is defined as:

$$\nabla_\theta L_G = -\mathbb{E}_{w_c \sim \mathbb{P}_\theta}[\nabla_\theta \log G(z | w_t) D(G(z | w_t) | w_t)] \qquad (3)$$

To prevent reward scaling, the architecture normalizes the reward by ways of mean subtraction, dividing by the standard deviation and using a sigmoid nonlinearity to restrict the range between 0-1.

Experiments and Results

In some experiments, example models were trained on the May 2017 dump of the English Wikipedia considering only unigrams and performing only a single pass through the dataset. The tested embodiments use the positive subsampling scheme. Both the conditional discriminator and generator in the tested embodiments are modeled using the Skip-Gram architecture which is a two layer neural network with a linear mapping between the layers. The first layer is equivalent to a lookup table for the chosen center word while the second layer is a lookup table for the sampled context word. The only difference between the discriminator and generator in the tested embodiments is that a sigmoid nonlinearity is used after the second layer in the discriminator as the goal is to differentiate real word context pairs from fake ones. In some embodiments, the conditional generator is designed to choose a word from our vocabulary and consequently, the example architecture uses the softmax nonlinearity which is used to categorically sample the negative context word. The Word Embeddings are taken to be the first dense matrix in the conditional discriminator. Finally, in some embodiments, the architecture uses cosine similarity as a metric as is common in the word embedding literature.

Training from Scratch

In one experiment, an example embodiment is tested for efficacy by training 300-dimensional word embeddings, the training curves for which may be found in FIGS. 1-3, and then qualitatively evaluating them by looking at the nearest neighbors of six handpicked words. Empirically it can be observed that the example method is effective in learning sensible embeddings and there are also fewer random words that are near common words such as queen and king.

TABLE 1

Top 8 Nearest Neighbors of Words under different Models

|  | Queen | King | Computer | Man | Woman | Graffiti |
| --- | --- | --- | --- | --- | --- | --- |
| Skip-Gram NCE | princess | prince | computers | woman | girl | banksy |
|  | king | queen | computing | boy | man | graffitied |
|  | empress | kings | software | girl | prostitute | wheatpaste |
|  | pxqueen | emperor | microcomputer | stranger | person | sekiranun |
|  | monarch | monarch | mainframe | person | divorcee | stencil |
|  | spudvilas | throne | computerized | drunkard | maidservant | spraycan |
|  | mankinda | ruler | minicomputer | policeman | seductress | posters |
|  | maconchy | harthacnut | workstation | villager | heroine | calligraffiti |
| Skip-Gram ACE | princess | prince | software | woman | girl | writers |
|  | prince | vi | computers | girl | herself | fantasy |
|  | elizabeth | kings | applications | tells | man | osborn |
|  | duke | duke | computing | dead | lover | decodes |
|  | consort | iii | hardware | boy | tells | graphic |
|  | duchess | iv | technology | strange | she | fiction |
|  | king | lord | technologies | love | baby | classic |
|  | eldest | viii | systems | dog | boy | signature |

Finetuning

Another conducted experiment tests the hypothesis of whether ACE is capable of learning better word embeddings for rarer words than NCE. To this end, pre-trained 50-dimensional Glove word embeddings and word embeddings taken from Colbert & Weston work are fine-tuned using an example algorithm (Refer to FIGS. 4-9 and the "Selected Generated Negative Samples through ACE" section below for training curves and examples). Performance was evaluated on the Stanford Rare Word Dataset with a set of baseline results.

As can be seen from the results in Table 2, the tested ACE sampling improves the performance of both models suggesting that it is general strategy.

TABLE 2

Spearman score (ρ * 100) for finetuned models on Rare Word Dataset

|  | Spearman Score |
|---|---|
| C&W baseline | 26.75 |
| C&W ACE | 32.86 |
| C&W NCE + ACE | 37.69 |
| Glove baseline | 33.94 |
| Glove NCE + ACE | 36.29 |

Selected Generated Negative Samples Through ACE

This section shows selected results of the negative words with the highest probability that were sampled under our conditional generator. In the example architecture, the generator is configured to takes a center word as input and produces a corresponding context word categorically sampled based on the output probabilities of the network. The results are taken from example finetuned C&W embeddings which was the team's best performing model on the Rare Word dataset. The probability of generated samples were in the range of $10^{-3}$ to $10^{-4}$ for a vocabulary size of 130 thousand words, suggesting that the generator is not choosing its favorite negative sample but instead a diverse set. To emphasize this point, two sets of generated samples are presented; the first set which could conceivably be seen as a positive examples taken from the real data distribution. The second set contains more random words which makes for easier negative examples.

TABLE 3

Top word with the highest probability

| Input Word | Hard Generated Sample | Easy Generated Samples |
|---|---|---|
| revolutionaries | biplanes | decorum |
| french | post-independence | superbike |
| anarchist | arsonists | jobs |
| secular | disgusted | codec |
| government | decertify | one-days |
| rules | participation | subcellular |
| federalist | collectivists | miscalculation |
| islamic | legalizing | taxonomists |
| religious | evangelical | matchday |
| movements | leftism | iowa |
| autistic | medicorp | chefs |
| superior | right-wingers | neoclassical |
| body | caress | sanctuaries |
| sword | maneuver | record-high |
| tv | technicolor | habitations |

Adversarial Hard Negative Mining for Cross Modal Embeddings

In some embodiments, learning high quality representations for data from different modalities but with a shared underlying meaning has been a key building block for information retrieval. Further, hard negative mining has shown to be effective in forcing models to learn discriminative features. A technique for hard negative mining for learning visual-semantic embeddings for cross-modal retrieval may be implemented. In some embodiments, hard negative pairs may be selected and sampled by an adversarial generator. In settings with attention, the adversarial generator may be able to compose harder negatives through novel combinations of image regions across different images for a given caption. This approach not only leads to higher scores across the board for some metrics but is also significantly more sample efficient and leads to faster convergence in fewer iterations.

Data from different modalities could exhibit different statistics but have shared underlying meaning. Cross-modal embedding models capture the shared semantics by learning mappings to a joint latent space on which semantic similarity across modality can be measured. Such model can be used for tasks that require understanding of the interplay between modalities. For example, image-caption retrieval needs object and scene recognition, and match the understanding to natural language description.

These models are typically learned in a supervised fashion by trying to separate observed similar cross-modal pairs against dissimilar ones. The dissimilar pairs can be constructed in any way, for example by randomly samplying, i.e. noise contrastive estimation (NCE). It has been observed that hard negatives make the model learning more discriminative features, generalize better and converge faster. Prior works used different heuristics to mine hard negatives. Two strategies for adversarially mine negatives for cross-modal embeddings may be implemented: examplar adversary and compositional adversary.

In some embodiments, given an observed pair in the training set, an examplar adversary swaps one item of the pair with an alternative from the training set of that modality using a learned distribution, in order to form a hard negative pair. This approach may be similar to the adversarial contrastive estimation (ACE) method applied to the multimodal embedding problem. It can be empirically demonstrated that ACE improves over VSE++, which also mines examplar for hard negatives, but not using adversarial learning and was the previous examplar-based SOTA for image caption retrieval.

The compositional adversary approach, on the other hand, deconstructs observed data into parts and adversarially reconstruct a new datum item that does not necessarily exist in the training set. This novel method produces even harder negatives than the examplar based approach, and empirically improves over the previous SOTA stacked cross attention network (SCAN).

In some embodiments, cross-modal retrieval may be implemented. Image-text matching by way of encoding full sentences and images has been an active area of research in recent years. Given a query, the retrieval task corresponds to retrieving the most relevant answer from a set of candidate answers. For caption retrieval given an image this amounts to picking the most accurate caption for the given query from a set of captions (image-caption retrieval). Conversely, when the query is a caption then the task is to retrieve the most relevant image(s) from a database of images (caption-image retrieval). We define the set of image-caption pairs S to be the set of all positive examples and any other pairing of image captions that are not in S to be negative examples. In some embodiments, a query may be defined as one of $i_k$ or $c_k$, and define the answer to the query to be the remaining one. Given a scoring function, s(i, c), that accepts an image-caption pair as input learning for cross-modal retrieval is often posed as via a contrastive objective that assigns higher scores to positive examples while assigning lower scores to negative ones. Triplet loss for cross-modal retrieval may be formulated as:

$$L = \sum_{k}^{K} (\alpha - s(i, c) + s(i, c')) + (\alpha - s(i, c) + s(i', c)) \quad (4)$$

Minimizing triplet loss is equivalent to maximizing the margin between positive pairs and negative pairs. Positive examples are readily available but the choice of negative examples are a design choice. As a standard baseline, for a random sampled mini-batch B={(i, c)}, with image i, and caption c, we treat the set $N_1$={(i,|c')} where c'≠c and the set $N_2$={(i',c)} where i'≠i as negative examples. As a result, the reformulated triplet loss is then:

$$L = \sum_{k}^{K} \left( \sum_{(i,c') \in N1} (\alpha - s(i, c) + s(i, c')) + \sum_{(i',c) \in N2} (\alpha - s(i, c) + s(i', c)) \right) \quad (5)$$

VSE++

Formally, given an image i and its corresponding caption c taken from a set of image caption pairs $S=\{i_n, c_n\}_{n=1}^{N}$ cross-modal refers to the task of retrieving either $c_n$ when provided $i_n$ or vice-versa.

To this end, we further define a corresponding image encoder $\phi$ and caption encoder $\psi$. In particular, $\phi$ is a deep CNN up to the final logits that encodes the feature representations of the image, while $\psi$ is a GRU based RNN encoder that maps the caption to its own embedding space. The transformation to a joint embedding space is then simply a linear projection of either encoded representations. A suitable scoring function such as cosine similarity can then be used to determine the compatibility of the image-caption pair.

$$f(i) = W_f^T \phi(i) \quad (6)$$

$$g(c) = W_g^T \psi(c) \quad (7)$$

$$s(i, c) = \frac{f(i)^T g(c)}{\|f(i)\| \|g(c)\|} \quad (8)$$

In some embodiments, hard negatives may be introduced as an alternative to randomly sampling easy negatives. These hard negatives are taken to be the maximum violating datum over the mini-batch for a given training query.

Stacked Cross Attention Networks (SCAN). VSE++ treats an image as a whole, and extract one feature vector for one image, which is then used in computing similarity with any given sentence embedding. SCAN instead extracts many feature vectors, each correspond to one object in the image, and computes one score per each pair of object feature and word feature, then aggregates those scores to get the overall similarity measure of the image and sentence. Beside the more sophisticated similarity metric, the image and word features in SCAN also are dependent on the context provided by the other modality, hence the name "cross attention", the rationale is to attend differentially to image regions and words using both as context to each other while inferring the similarity.

In some embodiments, a pre-trainedd detection network may be used as bottom-up attention mechanism to extract region features. For a given image I and sentence T, let the set of region features be V=$v_1$ . . . , $v_k$ and word embeddings be S=$e_1$, . . . , $e_k$, where $v_i$ and $e_j \in \mathbb{R}^D$. To attend to words in the sentence with respect to each image region we first compute the cosine similarity matrix for each possible image region and word pair in V and S. The attention weights for each word given an image region is simply the normalized probability given by computing the softmax. Finally, the attended sentence vector for $v_i$ is simply the sum of the products of the attention weights and word embeddings.

$$s_{ij} = v_i \cdot e_j \quad (9)$$

$$\alpha_{ij} = \text{softmax}(\lambda_1 s_{ij}) \quad (10)$$

$$a_i^t = \sum_j \alpha_{ij} e_j \quad (11)$$

Here, $\lambda_i$ is the inverse temperature of the softmax and to determine the importance of each image region given the sentence context. The relevance $R(v_i, a_i^t)$, between the i-th region and the sentence is simply the as cosine similarity between the two. Finally, the similarity for image I and sentence T is $S_{avg}(I,T) = 1/k \Sigma_{i=1}^{k} R(v_i, a_i)$.

Method

ACE for Visual Semantic Embeddings. In some embodiments, hard negative mining in visual semantic embeddings is implemented. In some embodiments, compositional hard negative mining with attention is implemented. Our approach is inspired from the Adversarial Constrastive Estimation framework (ACE) where the defacto random sampler is augmented with an adversarially learned adaptive sampler that finds harder negative examples. To apply ACE, we replace the form of the hard negatives which represents a maximum violation in embedding space to sampled hard negatives sampled by a conditional generator network that is trained adversarially against the embedding models. Formally, we define a generator network for each type of retrieval i.e. image or caption, that augments the fixed negative sampling distribution to the following:

$$p^-(i|c) = \lambda p_{noise}(i) + (1-\lambda) g_\theta(i|c) \quad (12)$$

$$p^-(c|i) = \lambda p_{noise}(c) + (1-\lambda) g_\theta(c|i) \quad (13)$$

where $p_{noise}$ is some fixed noise distribution, $g_\theta$ is a conditional distribution with learnable parameters θ and λ is a hyperparameter. Learning then proceeds in a GAN-style min-max game alternating between updating the embedding model and the generator. There is one important distinction to typical GAN: $g_\theta(i|c)$ defines a categorical distribution over possible images, and samples are drawn accordingly. For caption-image retrieval this is the set of all images in the training set other than the actual correct label image and vice-versa for image caption retrieval. Concretely, the generator can be expressed by t(i,c)=softmax(p(f(i),g(c))) where function p takes image features and caption features as input and outputs a k dimensional vector over the candidate set of answers. Due to the discrete sampling step, $g_\theta$ cannot learn by regular gradient descent through the embedding model. We appeal to the policy gradient literature to train the generator and use the REINFORCE gradient estimator with the embedding model's score on the image-caption pair acting as a reward for the generator. An overall loss for visual-semantic embedding is then given by:

$$L = \sum_k^K \left[ \left( \max_{(i,c') \in N1} (\alpha - s(i,c) + s(i,c')) + \right. \right.$$
$$\max_{(i',c) \in N2} (\alpha - s(i,c) + s(i',c)) \right) +$$
$$\left. \sum_{c^-} ([\alpha - s(i,c) + s(i,c^-)]) + \sum_{i^-} ([\alpha - s(i,c) + s(i^-,c)]) \right] \quad (14)$$

Where $c^-$ and $i^-$ are sampled from generator $p^-$. The first term in Equation 14 finds the hardest negative from current batch (local hard negative). The second term introduces harder negative samples from the entire dataset (global hard negative).

Compositional Hard Negative Mining. We now consider the case where instead of images, visual features are given to be image regions provided by a detection network. We have a set of image features $V = v_1, \ldots, v_k$ such that each image feature $v_i \in \mathbb{R}^D$ encodes a region in the original image. Also, instead a single caption embedding we represent each word in the caption individually. That is to say, given a sentence $S = e_1, \ldots, e_k$, we have that each $e_i \in \mathbb{R}^D$, represents an embedded word in a sentence. In the regular SCAN approach the model learns all possible latent alignments between words in a caption and image regions for one image. Intuitively, random sampling to craft negative examples over this space yields fewer hard negative examples due to the combinatorial complexity of the total number of possible negative samples. Ideally, we would like an efficient way to sample hard negatives from this space. Also, consider an alignment of an image region taken from a different image and word that is especially hard for the embedding model. Under the current setup such a negative alignment is not possible but could be extremely beneficial for the embedding model. Thus, it is desirable for the generator to select image regions independent of the source image in order to compose a harder negative given a specific word in the caption. Consequently, given all image regions in current mini batch, $V = v_{11}, \ldots, v_{1k}, \ldots v_{kk}$, the compositional generator defines a categorical distribution V for each $e_i \in S$. Iteratively, we craft a novel negative image by a composition of image features for each word.

Experiments

Figure 11A:
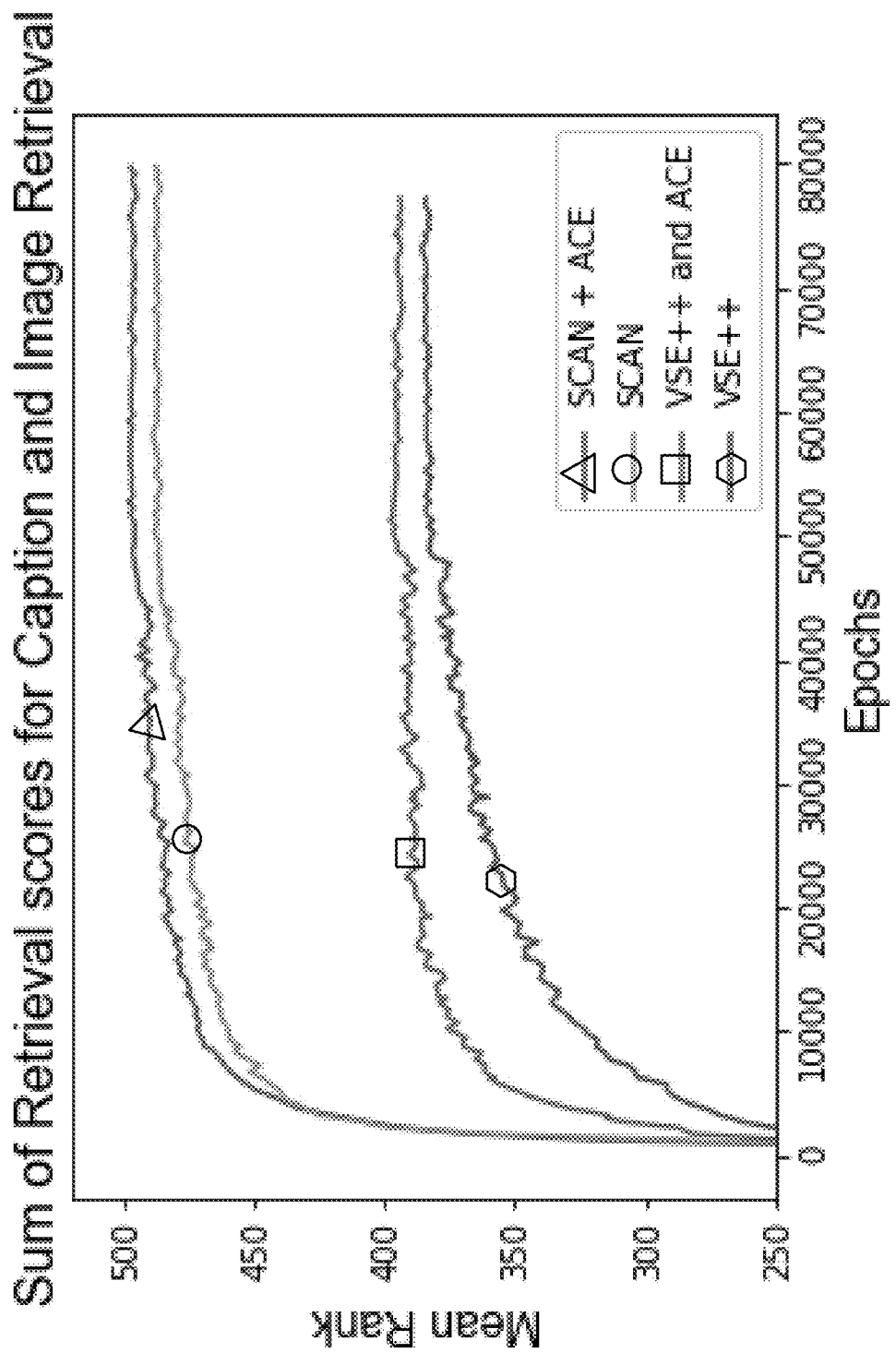
FIGS. 11A, 11B and 11C each illustrates performance of, respectively, VSE++, SCAN models with Ace, and SCAN models without ACE.
Figure 11B:
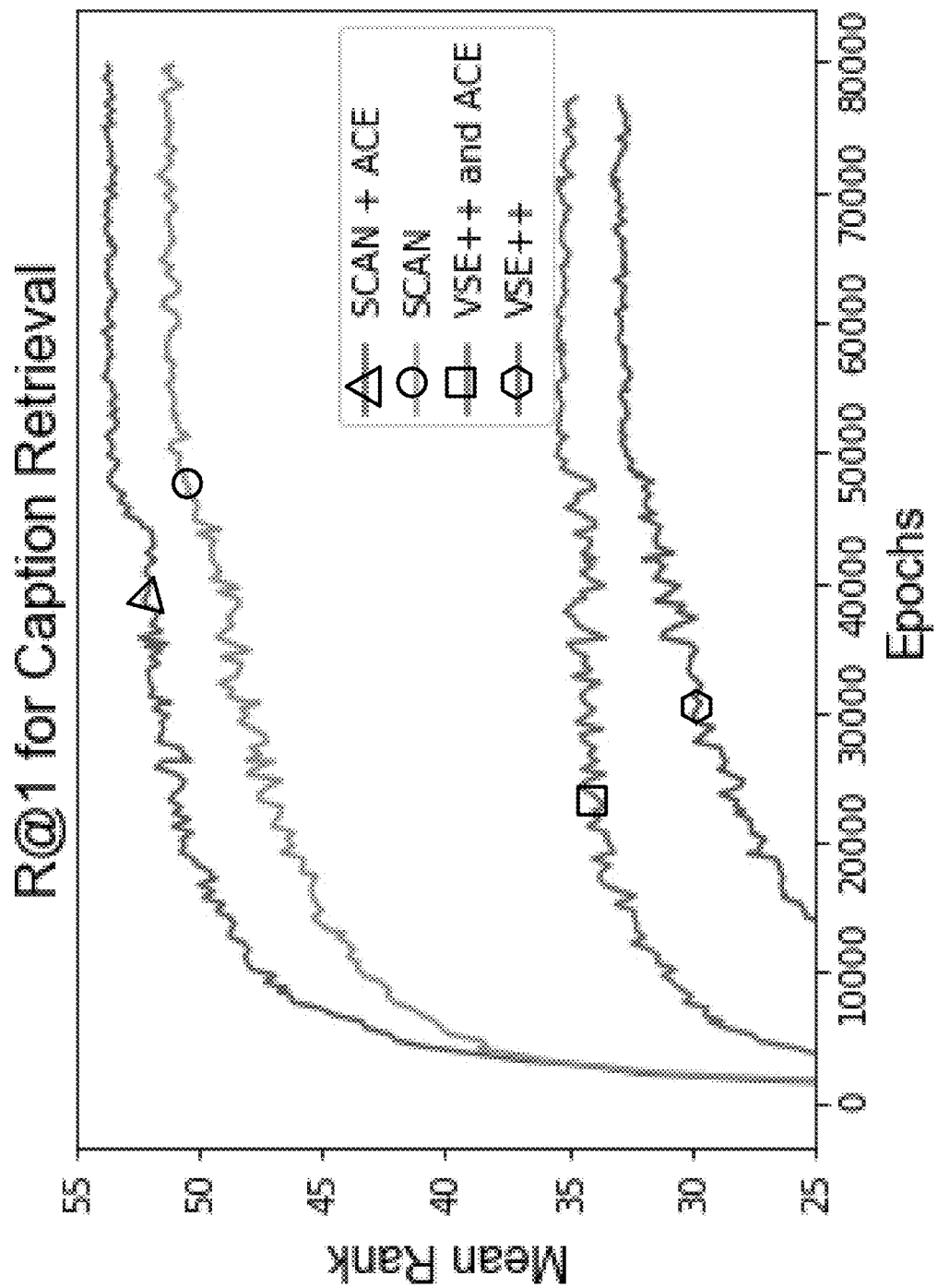
Figure 11C:
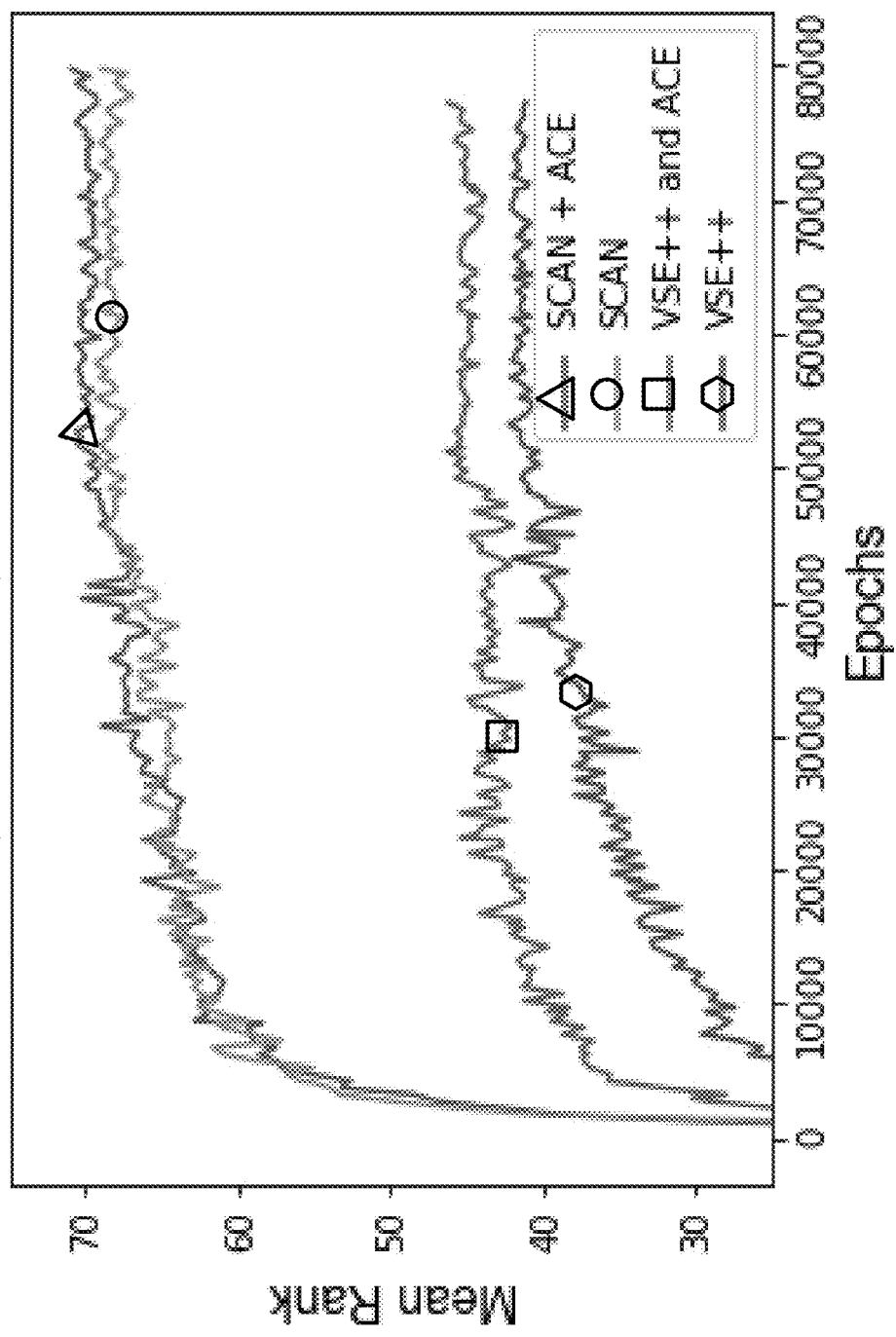

FIGS. 11A, 11B and 11C each illustrates performance of, respectively, VSE++, SCAN models with Ace, and SCAN models without ACE. FIG. 11A shows sum of retrieval scores for caption and image retrieval. FIG. 11B shows R@1 for caption retrieval. FIG. 11C shows image retrieval.

We perform experiments for both image and caption retrieval. VGG-19 are used as image encoder and the models are trained on 1C (1 fold) dataset. The text encoder's hidden state size may be set to 300 and joint space dimensionality to be 1024. As shown in the table below, which illustrates ACE VSE++ results, for caption retrieval, ACE improves R@1 by 0.9 percentage and R@10 by 1.7 percentage. One interesting observation is, although ACE is only applied to Caption Retrieval, Image retrieval scores are also improved by 0.9 percentage. We report sum over all recall scores and r1 in particular in FIGS. 11A to 11C.

| Method | Caption Retrieval R @ 1/R @ 5/R @ 10/ Medr | Image Retrieval R @ 1/R @ 5/R @ 10 |
|---|---|---|
| VSE | 43.4/75.7/85.8 | 31.0/66.7/79.9 |
| VSE++ | 43.6/74.8/84.6 | 33.7/68.8/81.0 |
| ACE VSE++ | 44.5/75.4/86.3 | 34.6/69.1/81.8 |
| VSE Att | 64.7/93.0/97.2 | 50.0/83.8/92.4 |
| SCAN (number taken from paper) | 67.5/92.9/97.6 | 53.0/85.4/92.9 |
| SCAN + ACE | 70.5/94.8/98.3 | 53.7/85.7/93.6 |

Furthermore, we report the mean and median ranking curves in FIGS. 11A to 11C. As shown in figure, ACE does indeed make the model converge faster.

For region attention model, as shown in the table above, ACE performances better than NCE for each metric.

Adversarial Contrastive Estimation for improving visual semantic embedding that learn by contrasting observed and fictitious samples are implemented in some embodiments. Specifically, a generator network may be implemented in a conditional GAN like setting to propose hard negative examples for the discriminator model. A mixture distribution of local hard negative examples of VSE++ along with an adaptive negative sampler that mines hard negatives leads to improved performance and faster convergence.

FIG. 10 shows an example electronic device 260. In some embodiments, GANs 200 may include a generator 215 and a discriminator 225, which may be implemented as digital circuit(s), analog circuit(s), or integrated circuit(s). For example, GANs 200 may be implemented through field-programmable gate arrays (FPGAs). Training or executing GANs with a vast amount of data would typically require a significant amount of computing power due to the complexity of GANs and the amount of input data required.

In some embodiment, GAN 200 may be trained in a centralized system. In other embodiments, GAN may be trained in distributed system implemented with a distributed architecture.

In some embodiments, GANs may be implemented in software or a combination of software and hardware components including storage devices, memories and processing devices 203 such as CPUs, GPUs, any type of general-purpose microprocessor or microcontroller, a digital signal processing (DSP) processor, an integrated circuit, a field programmable gate array (FPGA), a reconfigurable processor, or the like or any combination thereof.

A processing device 203 can be, for example, any type of general-purpose microprocessor or microcontroller, a digital signal processing (DSP) processor, an integrated circuit, a field programmable gate array (FPGA), a reconfigurable processor, or any combination thereof.

Memories 210 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices include memory, databases, and persistent storage.

I/O units 201 can enable GAN to interconnect with one or more input devices, such as a keyboard, mouse, camera, touch screen and a microphone, or with one or more output devices such as a display screen and a speaker.

Communication interfaces 205 can enable GAN to communicate with other components over network, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Storage devices 220 or database 209 may be configured to store information associated with GAN, such as instructions, rules associated with the generator and discriminator, and etc. Storage device and/or persistent storage may be provided using various types of storage technologies, such as solid state drives, hard disk drives, flash memory, and may be stored in various formats, such as relational databases, non-relational databases, flat files, spreadsheets, extended markup files, etc.

In some embodiments, a trained GAN 200 may be implemented to generate images 230 based on text 240 over a network 350.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to image-related applications.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

What is claimed is:

1. An electronic device for neural network training comprising:
   one or more processors;
   a non-transitory computer-readable medium storing one or more programs and data representative of a generative adversarial network (GAN) having a plurality of nodes and weights, the GAN including a generator and a discriminator, wherein the one or more programs are configured to be executed by the one or more processors, the one or more programs including instructions for:
   receiving data representative of a plurality of training samples;
   generating, by the generator, a plurality of hard negative samples based on the plurality of training samples, wherein the hard negative samples are generated from: samples which are initially misclassified by the GAN, or samples which are classified differently than statistically-similar samples, wherein the generator is based on a fixed noise distribution and a conditional distribution defining a categorical distribution over possible training samples; and
   generating an output, by the discriminator, based on the plurality of hard negative samples from the generator.

2. The electronic device of claim 1, wherein at least one of the generator and the discriminator includes a neural network.

3. The electronic device of claim 2, wherein the generator is defined for an image or caption retrieval.

4. The electronic device of claim 3, wherein the generator for the image retrieval is based on:

$$\lambda p_{noise}(i)+(1-\lambda)g_\theta(i|c)$$

wherein $p_{noise}$ is a fixed noise distribution, $g_\theta$ is a conditional distribution with learnable parameters $\theta$ and $\lambda$ is a hyperparameter, $g_\theta(i|c)$ and defines a categorical distribution over all possible images from a set of images in the plurality of training cases.

5. The electronic device of claim 3, wherein the generator for the caption retrieval is based on:

$$\lambda p_{noise}(c)+(1-\lambda)g_\theta(c|i)$$

wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images including correctly labelled images.

6. The electronic device of claim 2, wherein an output of the discriminator is used as a feedback to the generator.

7. The electronic device of claim 3, wherein the a score for an image-caption pair is used as a reward for the generator.

8. The electronic device of claim 7, wherein the GAN is configured to: receive data representative of an image, and generate an output to identify, from a plurality of text strings, a corresponding text string based on the data representative of the image.

9. The electronic device of claim 7, wherein the GAN is configured to: receive data representative of a text string, and generate an output to identify, from a plurality of images, a corresponding image based on the data representative of the text string.

10. A computer-implemented method comprising:
    receiving, by a generative adversarial network (GAN) having a plurality of nodes and weights, the GAN including a generator and a discriminator, data representative of a plurality of training samples;
    generating, by the generator, a plurality of hard negative samples based on the plurality of training samples, wherein the hard negative samples are generated from: samples which are initially misclassified by the GAN, or samples which are classified differently than statistically-similar samples, wherein the generator is based on a fixed noise distribution and a conditional distribution defining a categorical distribution over possible training samples; and
    generating an output, by the discriminator, based on the plurality of hard negative samples from the generator.

11. The method of claim 10, wherein at least one of the generator and the discriminator includes a neural network.

12. The method of claim 11, wherein the generator for the image retrieval is based on:

$$\lambda p_{noise}(i)+(1-\lambda)g_\theta(i|c)$$

wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images in the plurality of training cases.

13. The method of claim 11, wherein the generator for the caption retrieval is based on:

$$\lambda p_{noise}(c)+(1-\lambda)g_\theta(c|i)$$

wherein $p_{noise}$ is a fixed noise distribution, $g_\theta$ is a conditional distribution with learnable parameters $\theta$ and $\lambda$ is a hyperparameter, $g_\theta(i|c)$ and defines a categorical distribution over all possible images from a set of images including correctly labelled images.

14. The method of claim 10, wherein an output of the discriminator is used as a feedback to the generator.

15. The method of claim 11, wherein the a score for an image-caption pair is used as a reward for the generator.

16. The method of claim 15, wherein the GAN is configured to: receive data representative of an image, and generate an output to identify, from a plurality of text strings, a corresponding text string based on the data representative of the image.

17. The method of claim 15, wherein the GAN is configured to: receive data representative of a text string, and generate an output to identify, from a plurality of images, a corresponding image based on the data representative of the text string.

18. An electronic device comprising:

one or more processors; and a memory storing one or more program configured to be executed by the one or more processors, the one or more programs including instructions for:

receiving a text string or an image;

processing the text string or the image using a generative adversarial network including a generator and a discriminator; and choosing an matched image based on the processed text string from a plurality of images, or choosing a matched text string based on the processed image from a plurality of text strings;

wherein during a training phase, the generator is configured to generate a plurality of hard negatives samples for the discriminator, wherein the hard negative samples are generated from: samples which are initially misclassified by the GAN, or samples which are classified differently than statistically-similar samples, wherein the generator is based on a fixed noise distribution and a conditional distribution defining a categorical distribution over possible training samples.

19. The method of claim 18, wherein the generator is based on:

$$\lambda p_{noise}(i)+(1-\lambda)g_\theta(i|c)$$

wherein $p_{noise}$ is a fixed noise distribution, $g_\theta$ is a conditional distribution with learnable parameters $\theta$ and $\lambda$ is a hyperparameter, and $g_\theta(i|c)$ defines a categorical distribution over all possible images from a set of images in a plurality of training cases.

20. The method of claim 18, wherein the generator for is based on:

$$\lambda p_{noise}(c)+(1-\lambda)g_\theta(c|i)$$

wherein $p_{noise}$ is a fixed noise distribution, $g_\theta$ is a conditional distribution with learnable parameters $\theta$ and $\lambda$ is a hyperparameter, $g_\theta(i|c)$ and defines a categorical distribution over all possible images from a set of images including correctly labelled images.

* * * * *